United States Patent
Lee et al.

[11] Patent Number: 6,099,211
[45] Date of Patent: *Aug. 8, 2000

[54] MINIATURE TENON CUTTER

[75] Inventors: Leonard G. Lee, Almonte; Abdul Aziz, Kanata, both of Canada

[73] Assignee: Lee Valley Tools Ltd., Ottawa, Canada

[*] Notice: This patent issued on a continued prosecution application filed under 37 CFR 1.53(d), and is subject to the twenty year patent term provisions of 35 U.S.C. 154(a)(2).

[21] Appl. No.: 09/141,055

[22] Filed: Aug. 27, 1998

Related U.S. Application Data

[63] Continuation-in-part of application No. 09/033,988, Mar. 3, 1998.
[51] Int. Cl.⁷ .............. B27F 1/10; B23B 35/00; G01B 3/46
[52] U.S. Cl. .............. 408/1 R; 30/495; 30/500; 33/542; 33/634; 142/45; 408/203.5; 408/226
[58] Field of Search ............ 33/542, 543, 633–636, 33/628, 629, 639, 641; 7/163, 164; 30/495, 500; 408/1 R, 204–206, 203.5, 226; 144/4, 15, 18, 205, 206; 142/31, 32, 45

[56] References Cited

U.S. PATENT DOCUMENTS

| | | |
|---|---|---|
| 2,734 | 7/1842 | Briggs . |
| 11,349 | 7/1854 | Bailey et al. . |
| 15,530 | 8/1856 | Smith . |
| 17,175 | 4/1857 | Stevens . |
| 60,985 | 1/1867 | Young .................................. 30/495 |
| 76,205 | 3/1868 | Kraus . |
| 101,315 | 3/1870 | Sanders . |
| 117,786 | 8/1871 | Kniffen . |
| 151,828 | 6/1874 | Benham .................................. 30/495 |
| 166,674 | 8/1875 | Wood .................................. 30/495 |
| 220,442 | 10/1879 | Stearns .................................. 30/495 |
| 271,753 | 2/1883 | Whitsett .................................. 30/495 |
| 272,073 | 2/1883 | Miles . |
| 350,394 | 10/1886 | Ranney . |
| 353,761 | 12/1886 | Rush . |
| 374,773 | 12/1887 | Bradford .................................. 30/495 |
| 473,231 | 4/1892 | Leffel . |
| 475,560 | 5/1892 | Heydenreich . |
| 476,312 | 6/1892 | Resche . |
| 481,469 | 8/1892 | Bruner . |
| 539,954 | 5/1895 | Kay . |
| 617,441 | 1/1899 | Kelly .................................. 30/495 |
| 622,794 | 4/1899 | Brodhage . |
| 690,339 | 12/1901 | Wood .................................. 30/495 |

(List continued on next page.)

FOREIGN PATENT DOCUMENTS

| | | |
|---|---|---|
| 313237 | 4/1989 | European Pat. Off. . |
| 1040092 | 10/1953 | France . |

(List continued on next page.)

OTHER PUBLICATIONS

Operating Instructions from Woodcraft Supply Corp. for German dowel maker, series 14L22, which was sold in the United States prior to Mar. 3, 1997, together with seven (7) photographs.
Seven (7) photographs of antique Stanley No. 77 Dowel Making machine, including cutter head, cutter or blade.
Two (2) photographs of an antique tenon–former with funnel–shaped workpiece receiving structure.
Two (2) photographs of an antique adjustable diameter tenon–former.
*Trend Routing Technology* Catalog, p. 43, (undated).
Tool and Manufacturing Engineers Handbook, Fourth Edition, vol. 1, Machining, Society of Manufacturing Engineers, 1983, chapter 9, pp. 14–15.

*Primary Examiner*—Steven C. Bishop
*Attorney, Agent, or Firm*—John S. Pratt; Kilpatrick Stockton LLP

[57] ABSTRACT

A miniature tenon cutter having an aluminum body and a flat cutter blade positioned adjacent to a throat having a funnel mouth utilizing a gauge to assist in establishing cutter blade position. The tenon cutter is used with an electric drill motor, and it forms a cylindrical tenon with a sloping shoulder.

12 Claims, 2 Drawing Sheets

U.S. PATENT DOCUMENTS

| | | |
|---|---|---|
| 896,579 | 8/1908 | Richmond . |
| 1,029,503 | 6/1912 | Lumello . |
| 1,494,897 | 5/1924 | Freye . |
| 1,694,685 | 12/1928 | Hein . |
| 1,750,394 | 3/1930 | Dumont . |
| 2,000,789 | 5/1935 | Reis ............................................ 33/636 |
| 2,027,139 | 1/1936 | Abramson et al. . |
| 2,062,257 | 11/1936 | Douglas et al. . |
| 2,549,141 | 4/1951 | Taylor . |
| 2,556,415 | 6/1951 | Buck . |
| 2,597,099 | 5/1952 | Hayhurst . |
| 2,681,086 | 6/1954 | Degen . |
| 2,748,817 | 6/1956 | Sterns . |
| 2,764,187 | 9/1956 | Zemrowski . |
| 2,978,002 | 4/1961 | Ransom . |
| 3,053,118 | 9/1962 | Lavallee ................................. 408/226 |
| 3,118,476 | 1/1964 | Fiore . |
| 3,130,763 | 4/1964 | Schlosser et al. . |
| 3,229,731 | 1/1966 | Hilton . |
| 3,277,932 | 10/1966 | Rouse . |
| 3,973,862 | 8/1976 | Segal . |
| 4,077,737 | 3/1978 | Morse ..................................... 408/206 |
| 4,295,763 | 10/1981 | Cunniff . |
| 4,452,554 | 6/1984 | Hougen . |
| 4,460,532 | 7/1984 | Cornell . |
| 4,553,575 | 11/1985 | Brown . |
| 4,573,838 | 3/1986 | Omi et al. . |
| 4,595,321 | 6/1986 | Van Dalen . |
| 4,758,120 | 7/1988 | Bijl . |
| 4,767,244 | 8/1988 | Peterson . |
| 4,767,245 | 8/1988 | Shoji et al. . |
| 4,798,503 | 1/1989 | Huju ........................................ 408/204 |
| 5,025,842 | 6/1991 | Brimhall . |
| 5,213,456 | 5/1993 | Lee . |
| 5,353,507 | 10/1994 | Lee et al. ................................. 30/484 |
| 5,401,125 | 3/1995 | Sevack et al. . |

FOREIGN PATENT DOCUMENTS

| | | |
|---|---|---|
| 2535635 | 5/1984 | France . |
| 293770 | 3/1915 | Germany . |
| 96710 | 6/1982 | Japan . |
| 154709 | 6/1993 | Japan . |
| 1159724 | 6/1985 | Russian Federation . |
| 1766653 | 10/1992 | Russian Federation . |
| 81021 | 7/1934 | Sweden . |
| 133531 | 6/1929 | Switzerland ............................. 142/31 |
| 369980 | 4/1973 | U.S.S.R. . |
| 3726 | of 1869 | United Kingdom . |
| 15652 | of 1892 | United Kingdom ..................... 30/495 |
| 557335 | 11/1943 | United Kingdom . |

MINIATURE TENON CUTTER

REFERENCE TO RELATED APPLICATION

This is a continuation-in-part of U.S. patent application Ser. No. 09/033,988, filed Mar. 3, 1998, which is incorporated in this application by reference.

This invention relates to the formation of relatively small round tenons, particularly tenons used in the construction of rustic furniture, and to devices for forming such tenons.

BACKGROUND OF THE INVENTION

Round tenons have been long and widely used in woodworking, particularly in furniture making, and most particularly in chair making. Such tenons are used for attachment of chair rungs to chair legs and for securing other furniture and chair parts. Round tenons may be provided by securing a short length of round dowel in a suitably shaped and placed hole on the part requiring a tenon. More typically however, a round tenon is formed on the part itself, which part may also be round or have a square, rectangular or differently shaped cross section.

Many tenons, particularly in chair parts, have a truncated conical shape, i.e. are round but tapered. Such tenons are desirable in that they provide a snug fit in an appropriately shaped mortise (that is tapered). However, slight relative movement between the joint members loosens the joint. By contrast, accurately sized cylindrical tenons can move longitudinally in a mortise without loosening. Furthermore, the mortise-containing furniture member can lock around a cylindrical the tenon as the mortise member dries and shrinks.

A substantial number of methods and devices have been used for forming such tenons. They may be formed by hand using a pocket knife, draw knife, chisel, spoke shave or other tools. They may be formed on general purpose equipment like lathes and drill presses, and in some instances they may be formed using dedicated machines like the Stanley number 77 dowel making machine (although this machine will accept only a limited range of sizes of workpieces). There are also a variety of tenon forming cutters intended to be rotated against a workpiece utilizing a brace. Finally, high speed tenon-forming cutters for use in a drill press are available.

Some such devices are intended to form tenons having only a particular diameter or group of predetermined diameters. Others are purportedly capable of producing a range of tenon diameters. Most of these devices, including for the Stanley number 77 dowel making machine, have a cutting blade or blades that are difficult to sharpen because, among other reasons, their shape is complex. Still other devices are useful principally only in a drill press and form small diameter plugs, tenons or dowels, but are unwieldy, if not impossible to use in forming a tenon on the end of a relatively long, small diameter workpiece. None of these prior devices have been capable of forming relatively long tenons of small diameters (e. g., ¼", ⅜", ½ and ⁹⁄₁₆") on the end of a rung or other slender workpiece with an attractive, relatively wide shoulder, particularly a shoulder sloping away from the tenon.

The continuing need for cylindrical tenons described above, and this resurgence in the popularity of rustic furniture, have created the need for an economical but improved tenon-forming tool. Tenons of these small sizes arc useful, for instance, on chair rungs and decorative details such as lattice, trellis and fan-light frames.

It is thus an object of this invention to provide a tenon cutter for forming attractive, accurately sized cylindrical tenons with attractive tenon shoulders on components of rustic and other furniture.

It is a further object of the present invention to provide a tenon cutter that uses a blade that may be easily and quickly sharpened without significant risk of altering the desired blade profile and with minimal sharpening skill.

Yet another object of the present invention is the provision of a tenon cutter design that can be manufactured with sufficient economy to enable retail sale of the tenon cutter, or of a set of tenon cutters in different diameters, at an attractively low price.

SUMMARY OF THE INVENTION

The preceding objects and other objectives of this invention are achieved in a tenon cutter that has a straight, single-bevel cutter blade positioned in a body adjacent to a mouth having a funnel shape (i. e., its surface is that of a truncated cone) transitioning to a constant-diameter bore coaxial with the tenon cutter rotating axis. The tenon is received in the bore as it is formed with an attractive sloping shoulder having a truncated conical surface. A bevel on a flat cutter blade produces a cutting "edge" (or arris) that is positioned to lie along and just above or "proud" of the funnel-shaped mouth by securing the blade in a recess in the body. A hollow shank attached to the tenon cutter body is received in a drill chuck to rotate the tenon cutter against the end of a stationary workpiece received within the mouth of the tenon cutter, thereby causing the blade to shave material from the workpiece, so that a sloping shoulder corresponding to the funnel shape of the mouth is formed on the workpiece. As the tenon cutter is advanced, the shoulder "recedes," leaving a constant diameter tenon that advances into the throat or bore. Because of the shape of the tenon cutter and size of the cutter blade, tenons can be formed on relatively large diameter workpieces.

The hollow shank facilitates removal of tenons broken off in the tenon cutter bore by permitting a punch, rod or other tool to be inserted in the shank to press the obstruction out of the tenon cutter bore through the funnel mouth throat.

A cutter blade position setting gauge facilitates rapid, accurate positioning of the cutter blade, which is secured in the tenon cutter body by a machine screw that passes through a washer and a slot in the cutter blade into a screw thread insert such as a Helicoil® insert positioned in the tenon cutter body. Such a screw thread insert provides a more durable screw-to-tenon cutter body interface than simply threading the screw into a threaded bore in the body would provide, which is particularly important because the bore is necessarily shallow.

The gauge has an elongated cylindrical shank with one or more longitudinal flats. The shank is received snugly in the throat of the body. In order to properly position the blade, it is advanced toward the shank of the gauge until the corner of the blade touches the diametrical surface of the gauge shank. The blade screw is tightened firmly. The gauge is then rotated (by manipulating a knob that is attached to the shank and positioned in the funnel-mouth of the body) until one of the longitudinal flats on the gauge shank is opposite the blade comer (thus breaking contact between the blade comer and the gauge shank). The gauge may then be withdrawn without potentially disruptive contact with the cutter blade.

The tenon cutter body may be made of a variety of suitable materials, including hardwoods such as maple, cherry and sassafras, as well as metal alloys, polymeric materials and composites like fiber reinforced polymers.

Machined extruded aluminum provides an excellent material for manufacture of the body in which dimensional tolerances are easily maintained and which may be anodized for improved wear and reduction of friction. Because of their relatively small diameters, these tenon cutters typically do not need to be rotationally balanced.

DETAILED DESCRIPTION OF THE DRAWINGS

Figure 1:
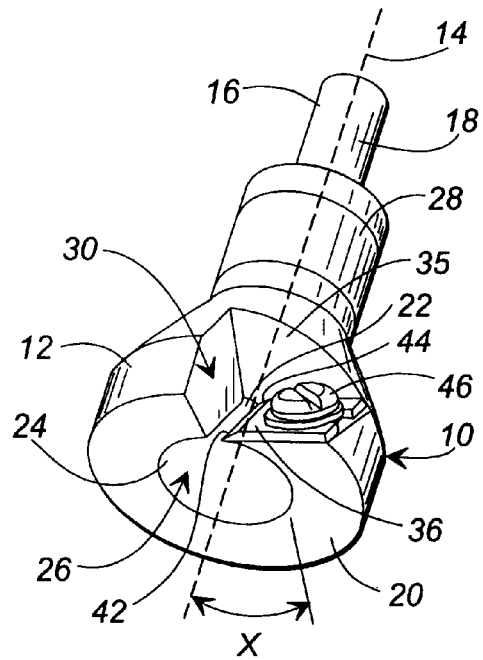
FIG. 1 is an isometric view of the miniature tenon cutter of this invention showing its face and funnel mouth.

The tenon cutter 10 includes a generally round cross section aluminum body 12 that is rotated about its longitudinal axis 14 with a chuck (not shown) that grasps shank 18 of spigot 16 that is press fit or otherwise secured in body 12. Body 12 is penetrated by a coaxial bore 22 nominally equal in diameter to the diameter of the tenon to be formed by tenon cutter 10. A funnel-shaped -mouth 26 is formed in body 12 transitioning from the face 20 of body 12 to the constant diameter bore 22 along an inwardly-sloping surface 24 that generally corresponds to the shape of the surface of a truncated conc.

A recess 30 in body 12 has a first wall 32 on a plane including axis 14, a second cutter blade support wall 34 in a plane generally tangent to (but just below) funnel mouth surface 26, and a third rear wall 35 intersecting the two walls 32 and 34.

Figure 2:
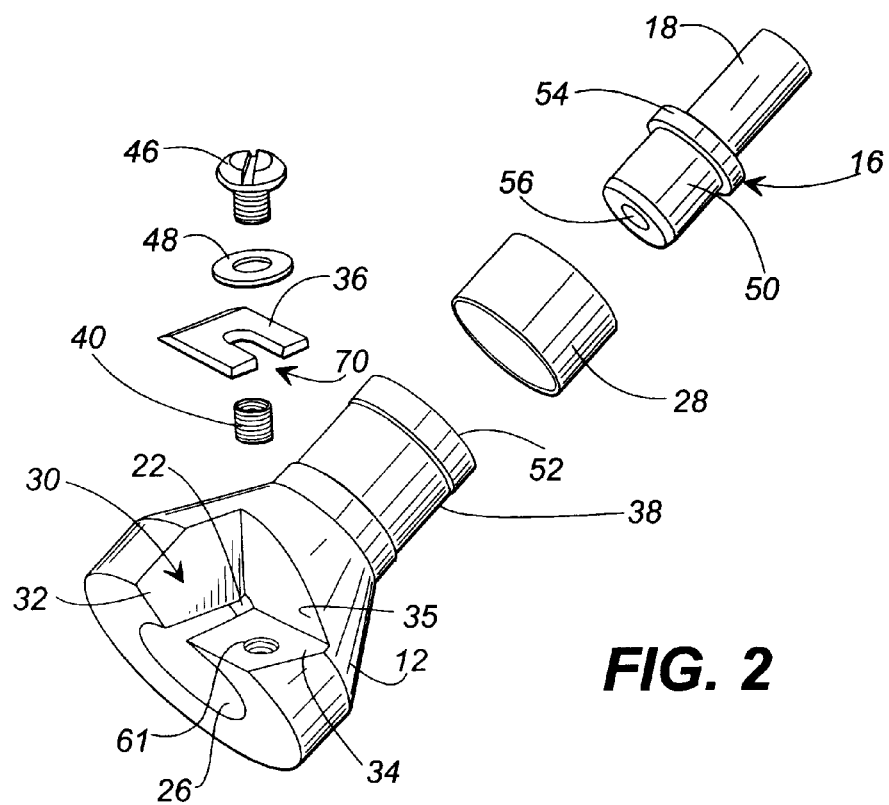
FIG. 2 is an exploded perspective view of the tenon cutter of FIG. 1.
Figure 4:
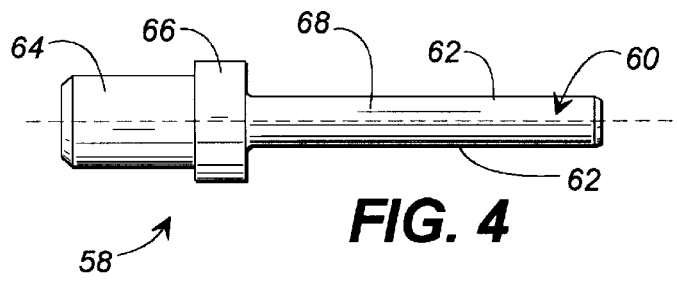
FIG. 4 is a side elevation view of the gauge shown in FIG. 3.
Figure 3:
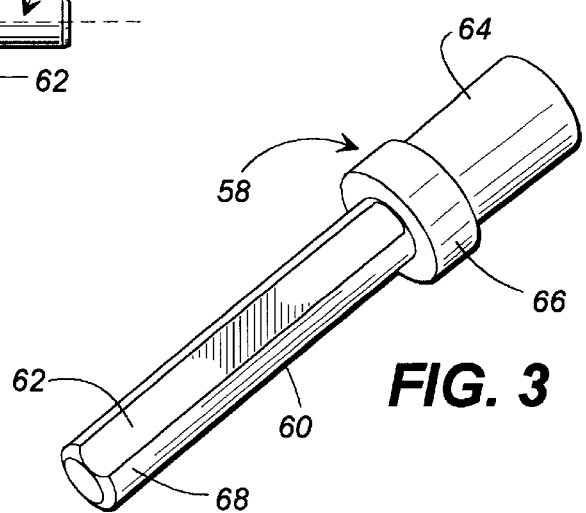
FIG. 3 is an isometric view to the cutter blade setting gauge of this invention.
Figure 5:
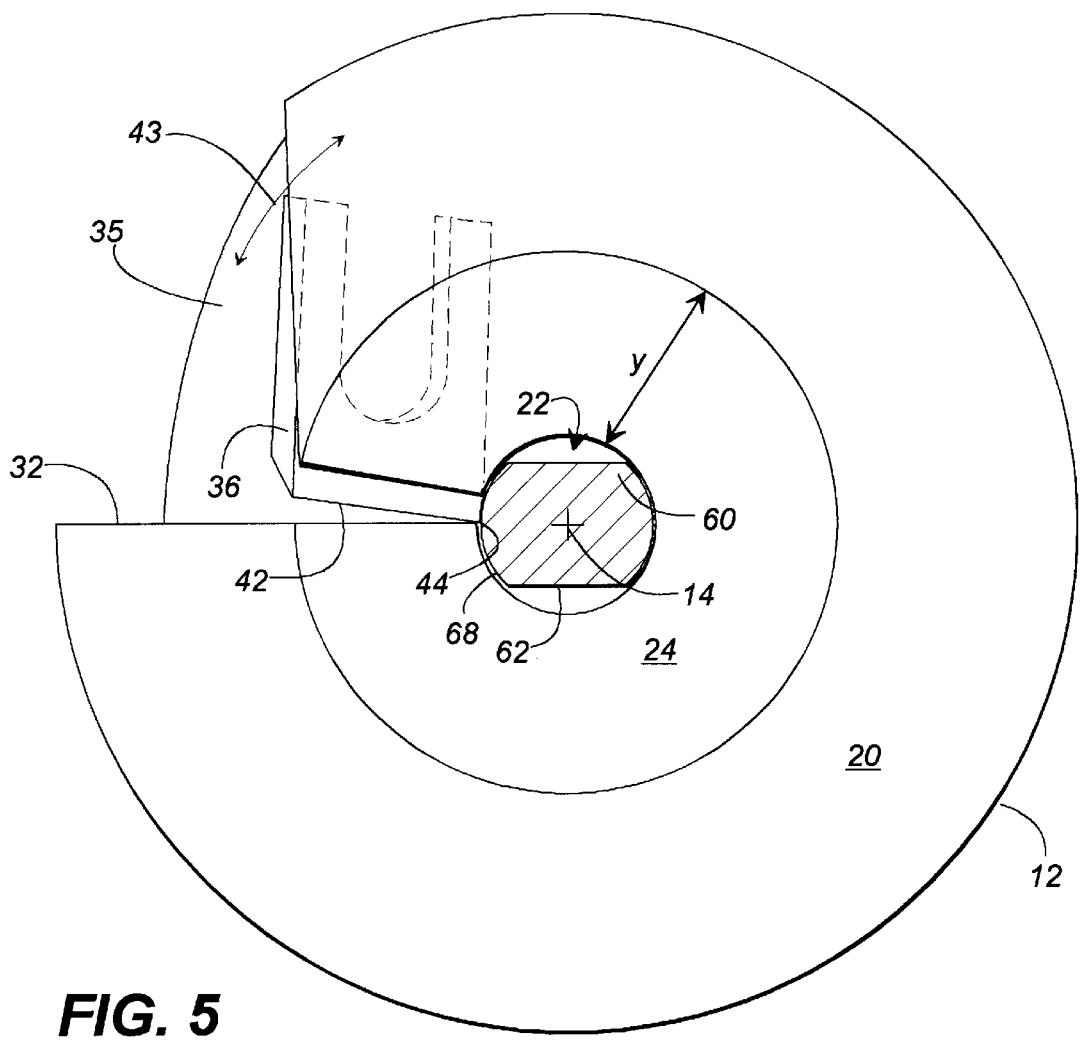
FIG. 5 is an enlarged axial view looking into the mouth of the tenon cutter with the gauge (shown in section) positioned in the mouth to set the cutter blade position.

As will be appreciated by reference to FIGS. 1, 2 and 5, cutter blade 36 is secured in recess 30 by passing screw 46 through a washer 48 for contact with the surface of blade 36 and then through a slot 70 in blade 36 and into bore 61 in body 12. Bore 61 is protected with a threaded insert 40, such as a stainless steel Helicoil® brand screw insert, in order to provide a more durable threaded interface between screw 46 and body 12 than simply threading bore 61 to receive screw 46 would provide. Other fasteners than the screw 46 could also be used, including (but not limited to) clamping arrangements attached to or formed by portions of the body 12. It is merely necessary that such alternative fasteners and fastening means permit the blade 36 readily to be removed for sharpening and re-secured in or attached to the body 12 with the cutting arris 42 and blade comer 44 properly positioned.

As shown in FIG. 2, spigot 16, which may be steel, may have relatively large diameter bulb 50 that is received in an appropriately enlarged portion of bore 22 in the back end 52 of body 12. Bulb 50 of spigot 16 is separated from shank 18 by a collar 54 that stops penetration of bulb 50 into body 12. Spigot 16 has a coaxial bore 56 through which a punch may eject tenons or other debris lodged in bore 22 in body 12.

A band or sleeve 28 positioned in a recess 38 on body 12 can be printed with the tenon cutter size, a brand name, patent information or an inspirational message.

Since cutter blade 36 is flat and is sharpened to form arris 42 with a single bevel, blade 36 is easily sharpened utilizing conventional techniques, such as those described in *The Complete Guide to Sharpening*, by Leonard G. Lee (Taunton Press).

Generally arris 42 should project beyond the surface 24 of funnel mouth 26 in the vicinity of face 20 approximately 0.03 to 0.04 inch, and the inner corner 44 of blade 36 should project into the bore 22 approximately 0.01 inch. Both projections are variable, the former to set aggressiveness of cut, the latter to establish tenon diameter. In order to permit such adjustments, the width of slot 70 in blade 36 relative to the diameter of screw 46 and the fit of blade 36 against rear wall 35 in body 12 should permit side-to-side movement of blade 36 of a few thousandths of an inch and pivoting movement about blade comer 44 of approximately five degrees (5°).

Blade 36 can be appropriately positioned using a gauge 58. Blade setting gauge 58 has a shank 60 that is generally cylindrical, has a diameter permitting it to slide snugly into bore 22 in body 12 and has one or more longitudinal flat portions 62. Gauge shank 60 attaches to a knob 64 that has a collar 66 that contacts funnel mouth surface 26 in use, thereby stopping travel of gauge shank 60 into bore 22.

After gauge 58 is positioned with its shank 60 in bore 22, blade 36 corner 44 is positioned against the cylindrical surface 68, and blade 36 is secured to body 12 with screw 46. Gauge 58 is then rotated so that a flat 62 is opposite blade comer 44, and is then withdrawn, leaving blade 36 properly positioned for forming tenons at the predetermined diameter of cylindrical surface 68. Blade corner 44 can be projected into bore 22 slightly more to reduce the diameter of a tenon produced with tenon cutter 10 or can be withdrawn from bore 22 slightly to increase tenon diameter.

The blade 36 can be adjusted to cut more or less aggressively, producing thicker or thinner shavings, by rotating the position of blade 36 around blade corner 44, as indicated by arrow 43 in FIG. 5, thereby projecting the cutting arris 42 of blade 36 more or less beyond surface 24 of funnel mouth 26. Greater projection produces thicker shavings, and smaller projection of arris 42 results in thinner shavings.

Typical nominal diameters of tenons that may be formed utilizing a tenon cutter 10 made in accordance with this invention are ¼ inch, ⅜ inch, ½ inch, and 9/16 inch, although many other diameters (preferably less than ¾ inch) are possible. The nominal depth of bore 22, and therefore the lengths of tenons that can be produced are, for instance, approximately one inch for ¼ and ⅜ inch diameter tenons and one and one-half inches for ½ and 9/16 inch tenons.

Cutter blade 36 and surface 24 of mouth 26, which are approximately the same width, should be fairly substantial in width relative to the diameter of bore 22 and the tenon produced in it. This makes it possible with this tenon cutter 10 to produce tenons having an attractive, wide shoulder and to form tenons on workpieces considerable larger in cross section than the tenon. For instance, tenon cutters 10 can be produced for all of the diameters mentioned above using a cutter blade 36 width of ½ inch. This will produce a tenon shoulder measuring radially on its face up to ½ inch. If the angle "x" (shown in FIG. 1) between surface 24 and the axis of rotation 14 is 30 degrees, then the portion of cutter blade most distant from the axis of rotation 14 will be approximately ¼ inch from the portion nearest axis 14. (This is distance "y" on FIG. 5). Thus, the largest shoulder it can produce will have a radius of approximately ¼ inch and will measure approximately ½ inch radially across its face.

The angle "x" between mouth surface 24 and axis of rotation 14 need not be 30 degrees but typically should be in the range of approximately 10 to 45 degrees.

Body 12 and spigot 16 may be anodized for reduced friction and improved wear resistance.

As will be readily understood by reference to the forgoing description, the accompanying drawings and following claims, numerous other modifications can be made in the tenon cutter of this invention without departing from the spirit of the invention or the scope of the following claims.

We claim:

1. Apparatus for forming a cylindrical section on a wooden workpiece, comprising:

a body having a longitudinal axis and, centered on the longitudinal axis, a cylindrical bore having a funnel-shaped mouth, a cutter blade having a blade corner, a gauge for accurately positioning the cutter when attaching it to the body, the gauge comprising a gauge shank having a cylindrical surface positionable in the cylindrical bore; and a fastener for attaching the blade to the body with the blade corner in contact with the gauge.

2. The apparatus of claim 1, further comprising a hollow shank attached to the body for rotating the body about the longitudinal axis.

3. The apparatus of claim 2, wherein the body and the hollow shank are aluminum.

4. The apparatus of claim 3, wherein the body is anodized.

5. The apparatus of claim 1, further comprising a screw thread insert positioned in a second bore in the body and wherein the fastener is a screw.

6. The apparatus of claim 1, wherein the cylindrical bore is less than three-fourths inch in diameter.

7. The apparatus of claim 2, wherein the hollow shank is press fit into a hole in the body coaxial with and larger than the cylindrical bore.

8. A tenon cutter comprising:

a body having an axis of rotation and, centered on the axis of rotation, a cylindrical bore connecting with a funnel-shaped mouth having a frusto-conical surface, a hollow shank attached to the body for rotating the body about the axis of rotation, a cutter blade, a fastener for securing the cutter blade to the body, and a gauge for use in positioning the cutter when attaching it to the body, the gauge comprising a gauge shank having a cylindrical surface and at least one surface positionable in the cylindrical bore.

9. A tenon cutter comprising:

an anodized aluminum body having a cylindrical bore transitioning into a funnel-shaped mouth having a frusto-conical surface, an axis of rotation and, centered on the axis of rotation, a hollow shank for rotating the body about the axis of rotation, a cutter blade, a screw for securing the cutter blade to the body by passing the screw through the cutter blade and into a screw thread insert positioned in a second bore in the body, and a gauge for use in positioning the cutter when attaching it to the body, the gauge comprising a gauge shank having a cylindrical surface and at least one surface positionable in the cylindrical bore.

10. A tenon cutter comprising:

(a) an anodized aluminum body having:

(i) a face penetrated by a cylindrical, through bore less than ½ inch in diameter and centered on an axis of rotation and (ii) a funnel-shaped mouth transitioning from the bore to the face, a hollow spigot press fit into the body coaxial with the axis of rotation for rotating the body about the axis of rotation using an electric drill motor, (b) for attachment to the body, a flat cutter blade penetrated by an opening and having a flat first side and a cutting arris formed by a bevel on the first side of the blade, and (c) a screw for passing through the opening in the blade and into the body for positioning the cutting blade with the arris adjacent to the funnel mouth and extending a small distance into the bore.

11. A method for forming a cylindrical tenon on a wooden workpiece comprising the steps of:

a) adjusting the position of a cutter blade in a tenon cutter using a gauge, the tenon-cutter comprising:

(i) a body having a face penetrated by a cylindrical bore centered on an axis of rotation and a funnel-shaped mouth transitioning from the bore to the face, (ii) the cutter blade having a corner, and (iii) means for adjustably securing the cutting blade to the body with a portion of the blade projecting into the funnel-mouth, and the gauge comprising a gauge shank having:

(iv) at least one semi-cylindrical surface sized to be received in the cylindrical bore in the tenon cutter body and (v) at least one flat surface, and the adjusting step comprising:

(vi) positioning the gauge shank in the tenon cutter bore, (vii) positioning the cutter blade with its corner contacting the gauge semi-cylindrical surface, (viii) securing the cutter blade in the body, and (ix) rotating the gauge shank so that the flat is opposite the blade corner and removing the gauge from the tenon cutter, b) securing the workpiece in an immobile position with an end of the workpiece projecting in an accessible location, and c) rotating the tenon cutter about the axis of rotation against the end of the workpiece to remove shavings from the workpiece leaving a cylindrical tenon with a sloping shoulder.

12. A method for adjusting the thickness of a shaving removed from a wooden workpiece in forming a cylindrical tenon on the workpiece comprising the steps of:

a) preliminarily adjusting the position of a cutter in a tenon cutter using a gauge, the tenon-cutter comprising:

(i) a body having a face penetrated by a cylindrical bore centered on an axis of rotation and a funnel-shaped mouth transitioning from the bore to the face, (ii) the cutter blade having a corner, and (iii) means for adjustably securing the cutting blade with at least a portion of the cutter blade projecting into the funnel-mouth, the gauge comprising a gauge shank having:

(iv) at least one semi-cylindrical surface sized to be received in the cylindrical bore in the tenon cutter body and (v) at least one flat surface, and the adjusting step comprising:
- (vi) positioning the gauge shank in the tenon cutter bore,
- (vii) positioning the cutter blade with its corner contacting the gauge semi-cylindrical surface,
- (viii) securing the cutter blade in the body, and
- (ix) rotating the gauge shank so that the flat is opposite the blade corner and removing the gauge from the tenon cutter, b) securing the workpiece in an immobile position with an end of the workpiece projecting in an accessible location, c) rotating the tenon cutter about the axis of rotation against the end of the workpiece to remove a shaving from the workpiece, d) noting the thickness of the shaving, e) at least partially unsecuring the blade from the body, f) pivoting the position of the blade about the location of the blade corner established in adjusting step (a) above so that more of the cutter blade projects into the funnel mouth if a thicker shaving is desired or less of the cutter blade projects into the funnel mouth if a thinner shaving is desired, g) securing the cutter blade in the body, and h) rotating the tenon cutter about the axis of rotation against the end of the workpiece to remove shavings from the workpiece leaving a cylindrical tenon with a sloping shoulder.

* * * * *